United States Patent [19]
Hershberger

[11] 3,855,489
[45] Dec. 17, 1974

[54] DYNAMOELECTRIC MACHINE HAVING IMPROVED LINT GUARD MEANS

[75] Inventor: Doran D. Hershberger, Sycamore, Ill.

[73] Assignee: General Electric Company, Fort Wayne, Ind.

[22] Filed: May 14, 1973

[21] Appl. No.: 360,046

[52] U.S. Cl. .................................. 310/85, 310/90
[51] Int. Cl. .............................................. H02k 5/10
[58] Field of Search .......... 310/71, 61, 68, 66, 68 C, 310/89, 90, 91, 88, 85, 158; 184/105, 106; 277/133; 308/163; 171/252; 285/13; 29/596

[56] References Cited
UNITED STATES PATENTS

| | | | |
|---|---|---|---|
| 2,003,000 | 5/1935 | Kelpe | 285/13 |
| 2,227,922 | 1/1941 | Blackmore | 277/133 |
| 2,275,996 | 3/1942 | Searles | 277/133 |
| 2,292,920 | 8/1942 | Barrows | 277/133 |
| 2,734,758 | 2/1956 | Schanke | 277/133 |
| 2,754,579 | 7/1956 | Shewmon | 29/596 |
| 2,897,023 | 7/1959 | Burkhalter | 277/133 |
| 2,912,290 | 10/1959 | Shaffer | 308/163 |
| 2,950,402 | 8/1960 | Glaza | 310/56 |
| 3,766,453 | 10/1973 | Schenk | 310/88 |

Primary Examiner—R. Skudy
Attorney, Agent, or Firm—John M. Stoudt; Joseph E. Papin

[57] ABSTRACT

In a dynamoelectric machine adapted for operation in an atmosphere having foreign particles therein. A chamber for lubricant is disposed in a portion of the dynamoelectric machine, and an opening in the dynamoelectric machine portion communicates between the chamber and the atmosphere. A rotatable member is axially movable in the dynamoelectric machine within predetermined limits and extends into the chamber and through the opening. A flange is disposed about the rotatable member and extends into close spaced relation with the dynamoelectric machine portion about the opening to form a predeterminately narrow gap therebetween for preventing the foreign particles which may accumulate along the rotatable member from entry through the opening into the chamber into wicking engagement with the lubricant therein. At least one of the flange and the dynamoelectric machine portion about the opening is generally overlapped with the other thereof a distance at least great enough to accommodate the axial movement of the rotatable member while maintaining the gap.

13 Claims, 6 Drawing Figures

DYNAMOELECTRIC MACHINE HAVING IMPROVED LINT GUARD MEANS

BACKGROUND OF THE INVENTION

This invention relates generally to dynamoelectric machines, and particularly to means for preventing entry of fibrous material, including lint and other foreign matter, into the bearing housings of these machines.

The provision of adequate ventilation for, and prevention of foreign bodies from gaining entry into, dynamoelectric machines, and the provision of means to accommodate for slight axial displacement of the motor shaft when the motor is energized, necessitates reconciliation of a number of disparate objectives. Typically, dynamoelectric machines such as electric motors and generators, and including those fractional horsepower electric motors used in laundry dryers, comprise a stator within which a rotor is rotatably carried by a shaft journalled through bearings disposed within bearing housings carried by end frames or shields secured to each end of the stator. Outer casings or enclosures have served to limit the passage of lint and other undesired particles into contact with the stator windings as well as into the inboard sides of the bearing housings. To effect adequate cooling of the stator windings of such enclosed machines cooling means, such as stationary baffles, air filters and ventilation slots, must frequently be provided within the motor casing. Apertures must often also be provided in the end shields to cooperate with ventilating fans mounted within the motor. Consequently, even where present such outer casings are not efficacious in preventing the transmission of lint, hair, fibers or other foreign matter into the bearing housings.

Typical dynamoelectric motors enclosed within a casing or shell, and incorporating the described means for ventilation of the stator windings are disclosed in U.S. Pat. Nos. 2,003,000; 2,550,443; and 2,950,402. The motors disclosed in these patents, however, do not include means for preventing the entry of lint and other fibrous matter into the bearing housings. For example, the guard structure disclosed in U.S. Pat. No. 2,003,000 is merely designed to prevent the entry of water into the motor, and would function as an elongated channel for the entry of foreign matter.

Aside from the significantly increased expenditure incurred in construction of enclosed motors, additional cost also occurs in the use of a rotor shaft from which any axial displacement or end-play is removed. Thus, if slight axial displacement of the rotor shaft could be tolerated without transmission of lint, fibers or other of the foregoing foreign particles along the shaft from the outboard side of the motor into the bearing housings and into contaminating contact with the lubricant present normally about the bearing; and, of equal significance, should it be possible to impede the transmission of these same undesired fibers and particles from entry into these same bearing housings from the inboard side of a dynamoelectric motor not having an outer shield or casing, such as that disclosed in copending application Ser. No. 246,286 filed Apr. 21, 1972 and assigned to the present assignee, a significant advance in the state of the art would be achieved.

Accordingly, it is a general object of the present invention to provide a dynamoelectric machine having improved means for preventing lint, hair and other fibrous materials from entering the machine bearing housings.

More specifically, it is an object of this invention to provide a dynamoelectric machine having improved means for inhibiting fibrous materials which tend to collect about exterior shaft portions of the machine from gaining entry into the bearing housings and into contact with bearing lubrication means maintained therein, which contact may lead to a wicking of lubricating oil from the bearing housings to the machine exterior thereby abbreviating the useful life of the machine.

Another object of the invention is to provide a dynamoelectric machine which has no outer shield or casing with means inhibiting entry at both the inboard and outboard ends of each of the machine bearing housings of lint and other fibrous materials.

A further object is to provide a dynamoelectric machine having lint guard means impeding the passage of lint, fibers and the like into bearing housings of the machine along the rotor shaft which lint guard means maintains a preselected spaced relationship with the end caps of the bearing housing though slight axial displacements of the rotor shaft occur.

The foregoing and other objectives and advantages of the invention will become more apparent from the description appearing hereinafter in conjunction with the accompanying drawings forming part of this application.

SUMMARY OF THE INVENTION

A rotor is mounted for rotation within the bore of the magnetic core. A bearing is supported within the bearing housing. At least one end cap having a central aperture is secured to an end of the bearing housing. A shaft is secured to the rotor extending through the bearing and the end cap aperture. An annular lint guard is secured to the shaft within the end cap aperture to form a narrow annular gap between the annular lint guard and the end cap.

In general and in one form of the invention, a dynamoelectric machine is adapted for operation in an atmosphere which may have foreign particles, such as lint, hair and other fibrous material, therein. A chamber for lubricant is disposed in a portion of the dynamoelectric machine, and an opening in the dynamoelectric machine portion communicates the chamber and the atmosphere. A rotatable member is axially movable in the dynamoelectric machine within predetermined limits and extends into the chamber and through the opening. Means is disposed about the rotatable member and extends into close spaced relation with the dynamoelectric machine portion about the opening to form a narrow gap therebetween for preventing the foreign particles which may accumulate along the shaft from entry through the opening into the chamber into wicking engagement with the lubricant therein. At least one of the preventing means which obviates entry of the accumulated foreign particles into the chamber and the dynamoelectric machine portion about the opening is generally overlapped with the other thereof a distance at least great enough to accommodate the axial movement of the rotatable member while maintaining the therebetween.

More particularly but still in general, a dynamoelectric machine in one form of the invention is adapted for operation in an atmosphere having foreign particles therein and is provided with a stator having a magnetic core with a bore therein and at least one end frame. A bearing housing is carried by the end frame and has a chamber for lubricant therein. A rotor is mounted for rotation within the bore of the magnetic core, and a sleeve bearing is supported within the bearing housing for lubricant communication with the chamber. An end cap is secured to the bearing housing for at least partially closing the chamber, and an aperture is provided in the end cap communicating between the chamber and the atmosphere. A shaft secured to the rotor is journaled by the sleeve bearing and extends through the chamber and the end cap aperture, and the shaft and rotor are axially movable a predetermined distance. A lint guard secured to the shaft includes a first annular collar press-fitted to the shaft, a second annular collar disposed coaxially about the first annular collar and extending through the end cap coaxially of the shaft a distance greater than the predetermined distance, and a transverse member structurally linking the second collar to the first collar.

DESCRIPTION OF THE PREFERRED EMBODIMENTS

Figure 1:
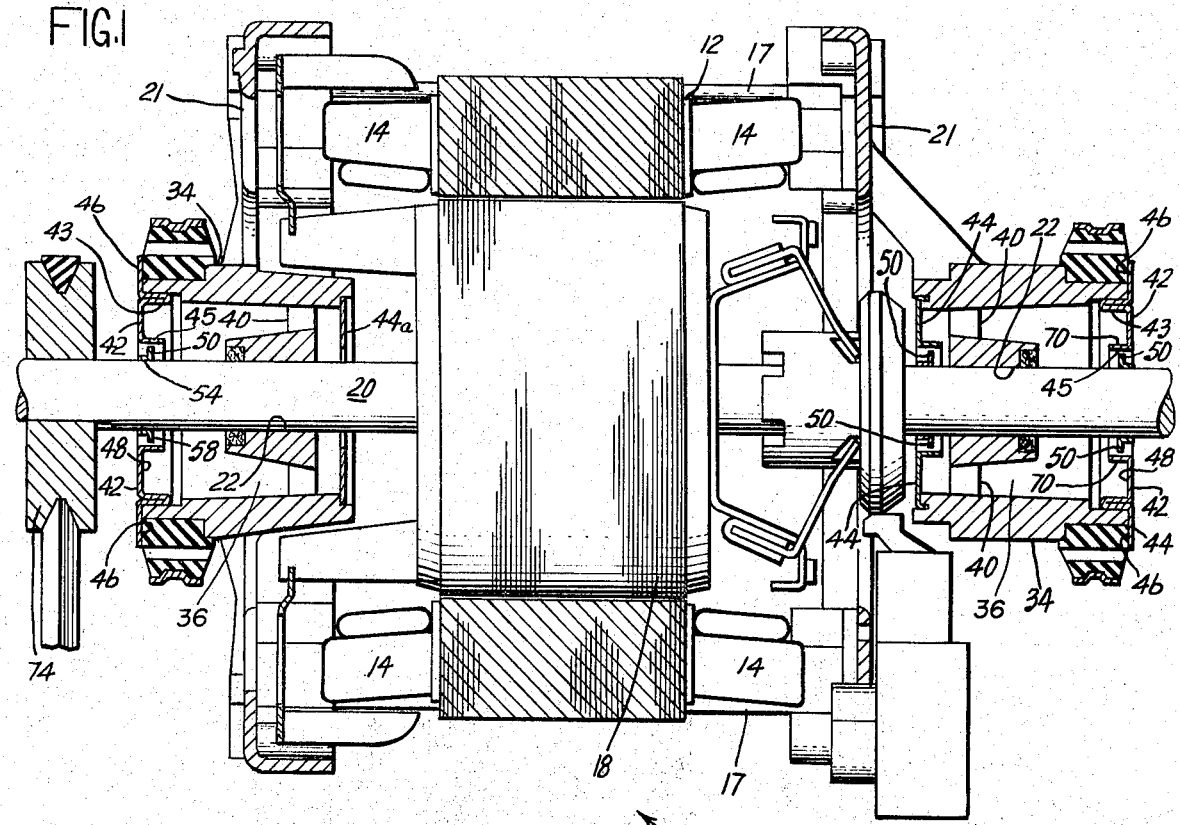
FIG. 1 is a partial sectional view of an unenclosed dynamoelectric motor embodying principles of the present invention in one form and with certain interior parts shown in elevation.

Referring now in detail to the accompanying drawings, there is shown in FIG. 1 a dynamoelectric machine, such as an electric motor 10, in which the present invention is illustratively practiced. The parts of the motor and their functional interrelationship are well-known and require therefore only brief characterization. Thus, the motor 10 comprises a stator core 12 provided with suitable windings 14. A rotor 18 is rotatably mounted within the cylindrical bore defined in the stator core 12 by journalling of the shaft 20 to which the rotor is secured, and the rotor and shaft generally constitute a rotatable member in bearings 22. The two cylindrical bearings 22 are coaxially disposed within two bearing housings 34 by means of radial support elements 40, and chambers or reservoirs 36 for lubricant are provided about the bearings within the bearing housings, respectively. The bearing housings 34 are carried by end frames 21 which are secured to the stator core by beam means 17. The ends of the housings 34 are closed by outboard end caps or closure members 42 and inboard end caps or closure members 44 and 44a, and each of the end caps includes an opening or aperture 45 in generally axial alignment with the bearing surface and shaft 20. Of course, end caps 44 may also be designated as a portion of end frame 21 thereby to define opening 45, and it may also be noted that means, such as cylindrical or sleeve bearings 22, for journaling shaft 20 are in lubricant communication with lubricant chambers 36.

Figure 3:
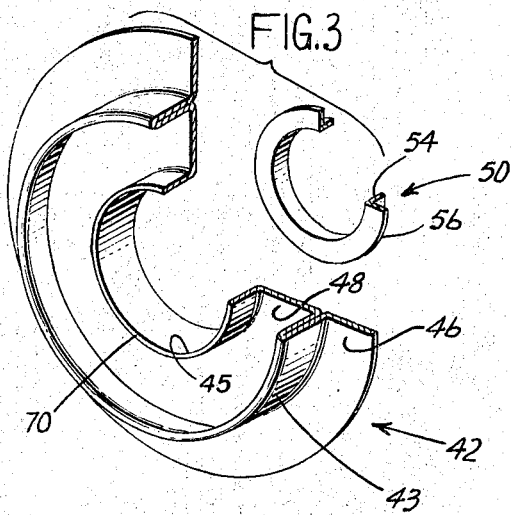
FIG. 3 is an exploded perspective view partially broken away of the lint guard and adjacent end cap shown in FIGS. 1 and 2.

The outboard end caps 42 each comprise a disc portion and a cylindrical flange portion 43, as seen most clearly in FIG. 3, formed intermediate of the inner and outer peripheries of the disc. The outer portions 46 of the discs abut the outer end surfaces of the bearing housings 34, and the cylindrical double folded flanges 43 are press-fitted to an inner surface of the bearing housings in substantially coaxial relation with shaft 20. The inner portion 48 of the discs each include central opening 45 which surrounds the shaft 20 and communicates between chambers 36 and the atmosphere exteriorly of dynamoelectric machine 10.

A conventional end cap seal 44a is shown, by way of comparison, at the inboard end of the left one of the two bearing housings 34 in FIG. 1 and is seen to have a slightly larger inside diameter than that defined by the bearing 22 itself. Conversely, in the preferred embodiment of FIG. 1, it will be observed that the openings defined in both the outboard and the other inboard end caps 42 and 44 are of substantially greater diameter than that of the bearing 22. Secured about the shaft 20 in substantial radial alignment within a portion of the end caps 42 and 44 are the collars constituting the lint guards 50.

Figure 4:
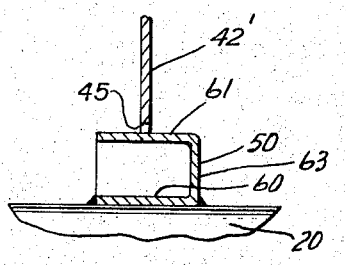
FIGS. 4, 5 and 6 are fragmentary sectional views similar to FIG. 2 showing alternative lint guard and end cap configurations for use with the machine shown in FIG. 1.
Figure 5:
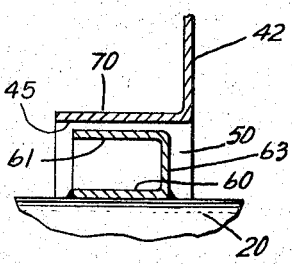
Figure 6:
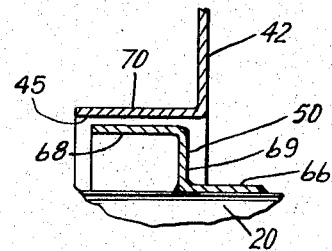

As seen, particularly in FIGS. 3 to 6 inclusive, the lint guards 50 may assume a variety of cross-sectional configurations. An L-shape configuration shown in FIGS. 1–3, a U-shape shown in FIGS. 4 and 5, and a modified Z-shape shown in FIG. 6 provide illustrative shapes. The L-shaped lint guard is an annular member or collar having a first cylindrical leg member or flange 54 secured along its length to the surface of shaft 20 and a second leg member or flange 56 extending generally radially outwardly from the peripheral surface of the shaft and integrally formed with an end of the first flange. The periphery of the flange 56 defines the inner periphery of a running clearance or gap 58 while the outer periphery of the gap is defined by cylindrical end cap flange 70 which extends toward bearing 22 generally coaxially of shaft 20. If desired, the outer periphery of the flange or leg member 56 may be flared to various degrees.

The U-shape lint guards shown in FIGS. 4 and 5 each comprise a pair of cylindrical collars or flanges 60 and 61 spaced one from the other in coaxial alignment and joined together at one end of each collar by a transverse member or flanges 63. Collars 60 are press-fitted or otherwise connected in displacement preventing engagement by suitable means well known in the art to shaft 20. The collars 60, 61 may be disposed upon the shaft 20 with the transverse member 63 positioned either inboard or outboard of the collars 60 and 61.

The modified Z-shape lint shield 50 seen in FIG. 6 comprises a pair of coaxial cylindrical collars or flanges 66 and 68. Collar 66 is press-fitted or otherwise connected in displacement preventing engagement by suitable means well known in the art to shaft 20 and extends outboard of the motor 10. Collar 68 is disposed radially within flange portion 70 of end cap 42 and 44 and connected at its outboard end to collar 66 by a transverse member or flange 69.

Figure 2:
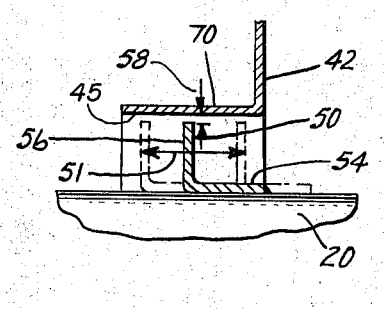
FIG. 2 is an enlarged fragmentary sectional view of a portion of the dynamoelectric machine shown in FIG. 1.

In the foregoing configurations, the width of the radial extent or gap 58 between the end cap and lint guard remains substantially constant though shaft 20 may undergo slight axial displacement or end play. In the embodiment shown in FIGS. 1–3, 5 and 6, for example, this is accomplished by expansion of the inner edge of the end cap into flange 70 within which flange the periphery of the lint guard is coaxially disposed. This flange may be disposed or extend either in a direction inboard or outboard of the remainder of the inner disc portion 48 of the end cap of which it is part. In this way, despite a slight axial displacement or end play of the shaft 20 between predetermined limits, as seen illustratively by directional arrows 51 in FIG. 2, the periphery of the lint guard 50 will remain within the opening defined by the end cap. Thus, the axial displacement or end play of the motor shaft 20, common to electric motors employed normally in laundry dryers or washers, for example, is fully accommodated without an undesired increase in the gap 58 while maintaining the gap. In the embodiment shown in FIG. 4, this same effect results from the provision of the lint guard outer collar 61 disposed within end cap 42' which end cap has no expanded edge adjacent the lint guard. It may be noted that the portion of end caps 42, 42' defining opening 45, such as inner disc portion 48 of end cap 42' and flange or sleeve 70 of end cap 42 (as best seen in FIGS. 4 and 5, respectively) and lint guard 50 are generally axially overlapping with respect to each other a distance at least great enough to accommodate the axial movement of rotor 18 and shaft 20 through the predetermined limits defining the end play thereof (as best seen in FIG. 2).

As indicated in the foregoing description, where the lint guard 50 is not present, lint or other fibers wrapped about the shaft tend to insinuate themselves under any seal that is normally present and into the bearing housing wicking out oil present therein for lubrication of the bearing system thereby shortening the effective life of the bearing and motor. With the addition of the lint guard 50 however, lint, such as that which might collect upon shaft 20 between pulley 74 and guard 50 in FIG. 1, is inhibited from gaining entry into the bearing housing 34.

It should be understood that the embodiments just described merely illustrate principles of the invention. Many modifications may, of course, be made to these particular embodiments without departure from the spirit and scope of the invention as set forth in the following claims.

What I claim as new and desire to secure by letters Patent of the United States is:

1. A dynamoelectric machine adapted for operation in an atmosphere having foreign particles therein comprising a stator with a bore therein, at least one end frame having a chamber for lubricant therein, a rotor mounted for rotation within the bore and adapted to be axially movable within predetermined limits, a bearing in the end frame for lubricating communication with the chamber, an aperture in the end frame connected between the chamber and the atmosphere, a shaft extending through the aperture into the chamber and received by the bearing and the shaft also being secured to the rotor for conjoint movement therewith, a generally annular lint guard secured to the shaft and disposed in close spaced relation with a portion of the end frame about the aperture, a narrow generally annular gap between the lint guard and the portion of the end frame about the aperture for preventing entry into the chamber of foreign particles which may accumulate along the shaft adjacent the aperture, and at least one of the end frame portion and the lint guard being generally axially overlapping with the other thereof a distance at least great enough to accommodate the axial movement of the rotor.

2. A dynamoelectric machine in accordance with claim 1 wherein said annular lint guard comprises an annular first leg member secured to said shaft and an annular second leg member extending outwardly from said first leg member toward a portion of the end cap defining the aperture.

3. A dynamoelectric machine in accordance with claim 2 wherein said second leg member extends outwardly from an end of said first leg member.

4. A dynamoelectric machine in accordance with claim 3 wherein said lint guard further comprises an annular third leg member secured to said second leg member generally, coaxially of, said annular first leg member.

5. A dynamoelectric machine in accordance with claim 4 wherein said annular third leg member is disposed generally radially of said annular first leg member.

6. A dynamoelectric machine in accordance with claim 1, further comprising another aperture in the end frame connected between the chamber and the atmosphere through which the shaft extends, another generally annular lint guard secured to the shaft and disposed in close spaced relation with another portion of the end frame about the other aperture, another generally annular gap between the other lint guard and the other portion of the end frame about the other aperture for preventing entry into the chamber of the foreign particles which may accumulate along the shaft adjacent the other aperture, and at least one of the other portion of the end frame and the other lint guard being generally axially overlapping to accommodate the axial movement of the rotor.

7. A dynamoelectric machine adapted for operation in an atmosphere having foreign particles therein comprising a stator having a magnetic core with a bore therein, at least one end frame, and a bearing housing carried by said end frame and having a chamber for lubricant therein, a rotor mounted for rotation within the bore of said magnetic core, a sleeve bearing supported within said bearing housing for lubricant communication with the chamber, an end cap secured to said bearing housing for at least partially closing the chamber and having an aperture communicating between the chamber and the atmosphere, a shaft secured to said rotor and journalled by the sleeve bearing and extending through the chamber and the end cap aperture with said shaft and rotor being axially movable a predetermined distance, and an annular lint guard secured to said shaft including a first annular collar press-fitted to said shaft, a second annular collar disposed coaxially about said first annular collar and extending through said end cap aperture coaxially of said shaft a distance greater than said predetermined distance, and a transverse member structurally linking said second collar with said first collar.

8. A dynamoelectric machine adapted for operation in an atmosphere having foreign particles therein comprising at least one end frame, a bearing housing carried by said end frame, a chamber for lubricant in the bearing housing, a bearing in the bearing housing and communicating with the chamber, a shaft journalled through said bearing and extending through the chamber with said shaft being axially movable a predetermined distance relative to the end frame, an end cap secured to said bearing housing and having a flange defining an aperture about the shaft communicating the chamber with the atmosphere, the flange extending coaxially of the shaft a distance greater than the predetermined distance, and an annular lint guard secured to said shaft for axial movement therewith through the predetermined distance within said end cap flange, the lint guard blocking the foreign particles which may accumulate along the shaft from ingress through the aperture into the chamber into wicking engagement with the lubricant therein.

9. In a dynamoelectric machine adapted for operation in an atmosphere having foreign particles therein, a chamber for lubricant disposed in a portion of the dynamoelectric mchine, an opening in the dynamoelectric machine portion communicating between the chamber and the atmosphere, a rotatable member axially movable in the dynamoelectric machine within predetermined limits extending into the chamber and through the opening; means disposed about the rotatable member and extending into close spaced relation with the dynamoelectric machine portion about the opening to form a predeterminately narrow gap therebetween for preventing the foreign particles which may accumulate along the rotatable member from entry through the opening into the chamber into wicking engagement with the lubricant therein, and at least one of the preventing means and the dynamoelectric machine portion about the opening being generally axially overlapped with the other thereof a distance at least great enough to accommodate the axial movement of the rotatable member while maintaining the gap.

10. In a dynamoelectric machine as set forth in claim 9, wherein one of the preventing means and the dynamoelectric portion about the opening comprise an annular flange.

11. In a dynamoelectric machine as set forth in claim 10, wherein the other of the preventing means and the dynamoelectric machine portion about the opening includes a peripheral portion disposed in the close spaced relation with the annular flange thereby to form the gap therebetween.

12. In a dynamoelectric machine as set forth in claim 11, wherein the annular flange extends generally inwardly toward the chamber.

13. In a dynamoelectric machine as set forth in claim 11, wherein the peripheral portion is another annular flange, the gap being between the first named and other annular flanges.

* * * * *

UNITED STATES PATENT OFFICE
CERTIFICATE OF CORRECTION

PATENT NO. : 3,855,489
DATED : December 17, 1974
INVENTOR(S) : Doran D. Hershberger It is certified that error appears in the above-identified patent and that said Letters Patent are hereby corrected as shown below:

Column 1, line 38, after "shell" delete ","
Column 2, line 33, including "A rotor is mounted" cancel down to and including "and the end cap." in line 41.
Column 3, line 52, delete ", and the rotor and shaft generally"

Column 4, line 63, change "and" to --or--
Column 6, line 18, delete "," (both occurrences)

Signed and sealed this 3rd day of June 1975.

(SEAL)
Attest:

RUTH C. MASON
Attesting Officer

C. MARSHALL DANN
Commissioner of Patents
and Trademarks